United States Patent [19]

Arthur et al.

[11] Patent Number: 5,752,601
[45] Date of Patent: May 19, 1998

[54] CARRYING CASE AND END CLOSURE THEREFOR

[76] Inventors: James W. Arthur, 7949 Winston Rd., Philadelphia, Pa. 19118; Douglas N. Meyer, 7334 Colgate Ave., St. Louis, Mo. 63130

[21] Appl. No.: 718,979

[22] Filed: Sep. 26, 1996

[51] Int. Cl.[6] .................................................. B65D 85/20
[52] U.S. Cl. ................................... 206/315.1; 206/326
[58] Field of Search ....................... 206/315.11; 220/326, 220/294, 293, 787

[56] References Cited

U.S. PATENT DOCUMENTS

| | | | |
|---|---|---|---|
| 605,908 | 6/1898 | Perry . | |
| 697,371 | 4/1902 | Sindorf . | |
| 3,337,028 | 8/1967 | Glavan | 206/315.11 |
| 3,678,611 | 7/1972 | Files | 206/315.11 |
| 4,006,837 | 2/1977 | Gates et al. . | |
| 4,202,462 | 5/1980 | Imber | 220/293 |
| 4,474,303 | 10/1984 | Maccise . | |
| 4,501,376 | 2/1985 | Bushby | 220/293 |
| 5,425,194 | 6/1995 | Miller | 206/315.11 |
| 5,542,206 | 8/1996 | Lisch | 206/315.11 |
| 5,640,795 | 6/1997 | Wambolt | 206/315.11 |

Primary Examiner—Paul T. Sewell
Assistant Examiner—Nhan T. Lam
Attorney, Agent, or Firm—Polster, Lieder, Woodruff & Lucchesi

[57] ABSTRACT

A portable carrying case (10) includes a hollow tube (12) having a length comparable to at least that of objects fitted into the tube for storage or transport. The tube has an interior wall (16) which is hexagonal. An end piece (20) permanently closes one end of the tube. An end cap (22) is insertable into the other end of the tube and is removable therefrom to secure an object in the tube. The end cap has a round post (26) which fits in the end of the tube. The tube has an annular groove (28) extending circumferentially about its interior wall. The post includes a locking member (30) extending radially outwardly from its side. The end cap is positioned in the tube with the locking member at a corner between adjacent sides (18a, 18b) of the hexagon. The end cap locks in place by pushing the post into the tube until the locking member is adjacent the groove, and then turning the end cap until the locking member is received in the groove.

10 Claims, 2 Drawing Sheets

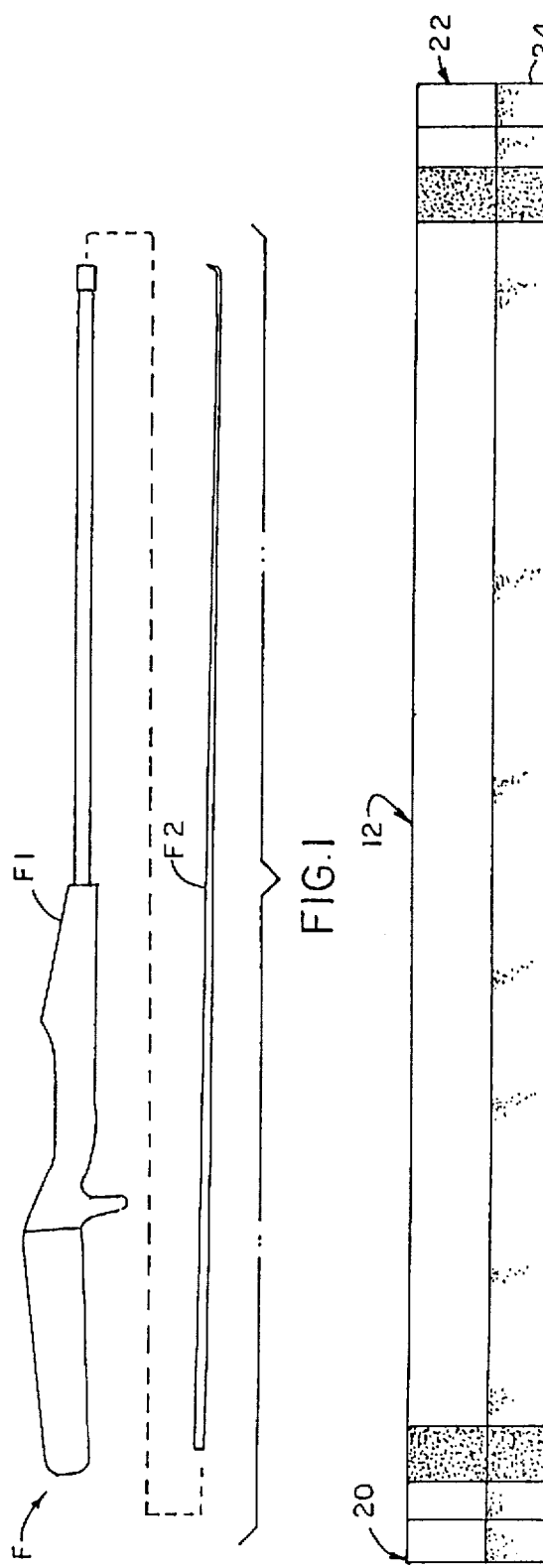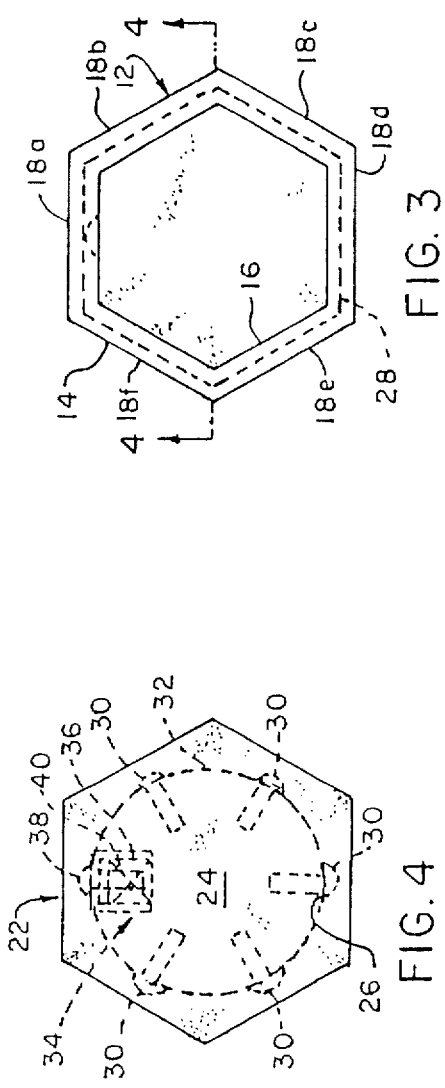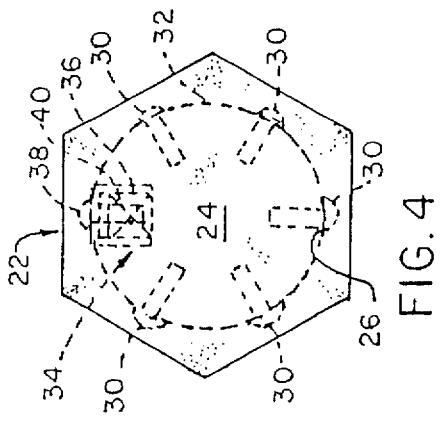

CARRYING CASE AND END CLOSURE THEREFOR

BACKGROUND OF THE INVENTION

This invention relates to a carrying case used for storing and transporting fly fishing rods and the like, and more particularly, to a such a carrying case having an improved end closure.

Fishing rods, for example, those used for fly fishing are comprised of detachable sections which are joined together when a fisherman is going fishing, and detached from each other for storage and transport. There are various types of storage and transport cases available for storing a fishing rod and for carrying it from one place to another. In transporting a fishing rod, it is important that the rod be securely stored and that the carrying case not be opened inadvertently. The materials from which fishing rods are made are durable, but they can still be damaged if there is an accidental spillage from these carrying cases. Fishing rods can be very expensive, costing well into the hundreds of dollars. Accordingly, a damaged rod can be costly to repair or replace if the carrying case cannot be securely closed and kept closed until the rod is to be used again.

Carrying cases come in a variety of materials. An upscale version of such a case is made of fine woods and is finished so as to provide a tasteful and appealing appearance. In providing an end closure for such a carrying case, it is important that the material from which the end closure is made be compatible with the materials from which the rest of the carrying case is made; while at the same time insuring that the end closure provides a secure closure for the fishing rod components stored in the case. It will also be appreciated that in addition to sections of a fishing rod, other tubular materials, or materials (cloth, prints, etc.) which can be rolled up can also be transported in such a case.

BRIEF SUMMARY OF THE INVENTION

Among the several objects of the present invention may be noted the provision of a carrying case for transporting expensive items such as fishing rods and other rolled up or tubular objects and to insure that the fishing rod, or other objects, are safe from damage when stored or transported in the case;

the provision of such a carrying case to be appropriately sized for ease of transport and storage of a fishing rod, the rod typically being disassembled for storage and transport;

the provision of such a carrying case to employ a novel end closure arrangement for closing the case;

the provision of such a carrying case which is of a regular polygon shape, both externally and internally, and the end closure arrangement includes an end cap having a round post section fitting into the open end of the case;

the provision of such a carrying case having locking members installed about the post and fittable into an annular groove formed on the inside wall of the case to lock the end cap in place by twisting the end cap;

the provision of such a carrying case in which the end cap is locked in place and tightly secured when so locked so as not to be inadvertently opened;

the provision of such a carrying case to be available in a variety of sizes to accommodate other objects besides fishing rods and to securely store such items and allow them to be readily transported;

the provision of such a carrying case to have a body formed of a single piece of shaped wood or other suitable material; and, the provision of such a carrying case to be readily attached to a sling so the case can be draped over someone's shoulder for ease of carrying.

In accordance with the invention, generally stated, a portable carrying case is for storing and transporting fishing rods and other rounds, tubular, or rolled-up objects. A hollow tube has a length which is comparable to at least that of the sections of fishing rod fitted into the tube for storage or transport. The tube has an interior wall which is hexagonal. An end piece permanently closes one end of the tube. An end cap is removably insertable into the other end of the tube to secure an object in the tube. The end cap has a round post which fits in the end of the tube. The tube has an annular groove extending circumferentially about its interior wall. The end cap includes a locking member which mounts on the side of the post and extends radially outwardly therefrom. The post is positioned in the tube with the locking member at a corner between adjacent sides of the hexagon. The end cap is then locked in place by pushing the post into the tube until the locking member is adjacent the groove. By then turning the end cap, the locking member is received in the groove and it cannot be withdrawn from the groove except by twisting the end to a corner position again. Other objects and features will be in part apparent and in part pointed out hereinafter.

BRIEF DESCRIPTION OF THE SEVERAL VIEWS OF THE DRAWINGS

In the drawings,

FIG. 1 is a representation of a fishing rod having detachable sections;

FIG. 2 is a side elevational view of a carrying case in which the fishing rod segments are stored or transported;

FIG. 3 is an end view of an open end of the carrying case and FIG. 4 an end cap which fits into the open end of the case to close it;

FIG. 7 is a first interior view of the open end of the carrying case illustrating installation of the end cap thereon; and.

Corresponding reference characters indicate corresponding parts throughout the drawings.

DETAILED DESCRIPTION OF THE INVENTION

Figure 5:
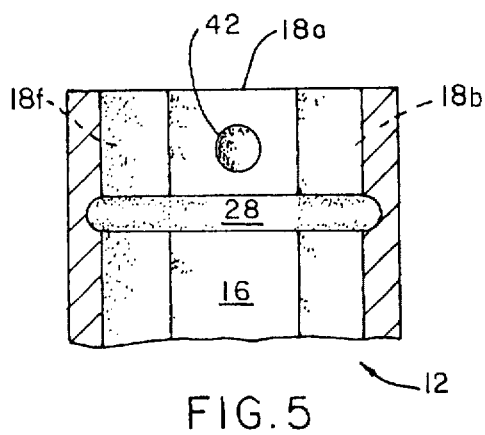
FIG. 5 is an elevational view of a portion of the inside of the carrying case at its open end.

Referring to the drawings, a fishing rod F is shown in FIG. 1 to comprise two sections F1 and F2 which can interconnected for use by a fisherman when fly fishing, for example. A portable carrying case of the invention is indicated generally 10 in FIG. 2. The carrying case is for storing and transporting the sections of the fishing rod when they detached from each other. Although not shown, it will be understood that other objects which are round, tubular, or can be rolled-up into a tubular shape can also be readily and safely transported in the case. The carrying case is comprised of three pieces. First, is a hollow tube 12 which forms the storage compartment for the sections of the fishing pole. Accordingly, the length of tube 12 is at least that of the longer of the sections of the fishing rod. Importantly, the tube has a hexagonal shape so, as shown in FIG. 3, both an exterior wall surface 14 of the tube is hexagonal, as is the interior wall 16 of the tube. Thus, tube 12 can be said to comprise respective wall sections 18a–18f.

An end piece 20 permanently closes one end of the tube. The end piece has a hexagonal head corresponding in dimensions to that of the tube at the exterior surface thereof, so when the end piece is fitted in place, the exterior surfaces of the end piece and tube are flush with each other.

The other, open of the tube is closed by an end cap 22. The end cap includes an outer head section 24 which is hexagonally shaped and sized so when the end cap is in place, the exterior of the head section is also flush with the exterior surface of the tube. The end cap further includes a circular shaft or round post 26 insertable into and removable from the open end of the tube. That is, the diameter of post 26 corresponds to the distance between opposite sides interior of the tube, at the midpoint of the respective sides. This is as indicated at D in FIG. 7.

Tube 12 has an annular groove 28 extending circumferentially about the interior wall of the tube. Post 26 includes a plurality of locking members 30 mounted on the sidewall 32 of the post. This locking members comprise studs which are embedded in the sidewall of the post and extend radially outwardly from the sidewall. Preferably the locking members are equidistantly spaced about the post. As shown in the drawings, there are six studs 30 and these are positioned 60° apart about the base of the sidewall. It will be understood that the number of locking members used is a function of the number of sides of the polygon forming the carrying case tube. For, example, the number of locking members could be one-half the number of sides if the polygon has an even number of sides.

Figure 8:
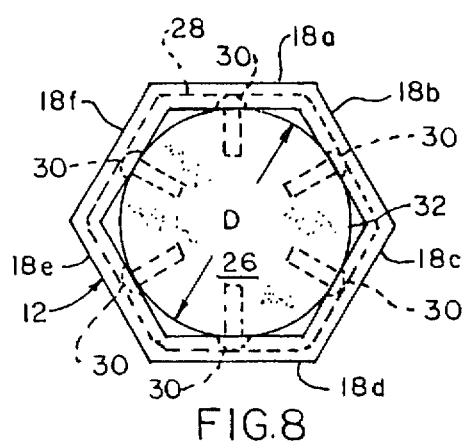
FIG. 8 is a second interior view of the case illustrating the end cap as installed.
Figure 7:
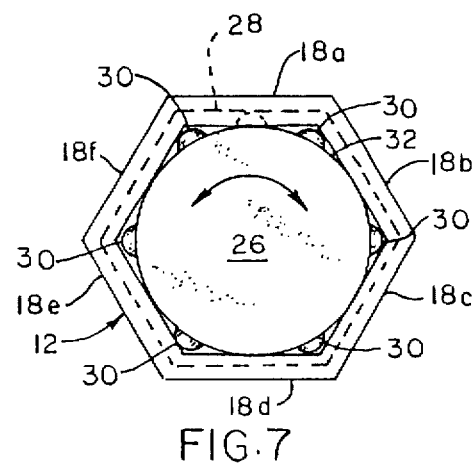

Referring to FIGS. 7 and 8, to lock end cap 22 in place, the end cap is positioned such that the studs 30 are located at the corners between adjacent sides of the tube. The end cap is then pushed into the tube until the studs are at the level of groove 28. Now, the end cap can be twisted in either direction as indicated by the arrow in FIG. 7. This action rotates the studs from their position shown in FIG. 7 in which the studs are outside of the groove, to their position shown in FIG. 8 in which the studs are now captured or received in the groove.

Figure 6:
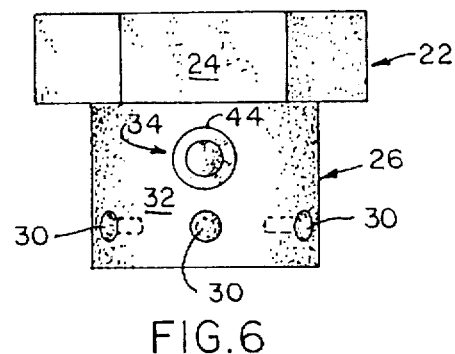
FIG. 6 is a side elevational view of the end cap.

In addition to the locking members 30, the end cap further has a latching means indicated generally 34 for latching the end cap in its locking position. As shown in FIG. 4, post 26 has an inwardly extending bore 36 formed in its sidewall 32. The location of this bore is at a location different from that in which the locking members 30 are mounted on the post. A latch pin or catch member 38 is inserted into this bore. A biasing spring 40 (see FIG. 4) is inserted in bore 36 so to be behind pin 38 and urge the latch pin radially outwardly from the post. A depression 42 is formed in interior wall 16 of tube 12. The location of the hole is such that latch pin 38 is pushed into the depression by spring 40 when the locking members are positioned in groove 28. Accordingly, turning end cap 22 to its position where the locking members are received in the groove also positions the latch pin in depression 42 to latch the end cap in place. In FIG. 6, the latch pin is shown installed in post 26 immediately above one of the studs 30. While this is a preferable arrangement, it will be understood that the pin could be located to one side of a pin or the other, so long as the length of the pin was sufficient for it to be urged into a depression 42 by spring 40. It will also be understood that a depression 42 can be formed in each section of interior wall 16. This makes it easier to lock the end cap in place. Finally, although not shown, a sling can be attached to the carrying case for ease of carrying.

Finally, tube 12, end piece 20, and end cap 24 are preferably formed of wood, with the tube being of one variety and the end piece and end cap of a different variety. It will also be understood that the respective pieces can be stained or otherwise finished the same or differently. Also, the studs comprising locking members 30 and latch pin 38 are of a brass or other suitable material which provides a pleasing appearance. As shown in FIG. 6, a brass fitting 44 is used with latch pin 38 to produce a pleasing appearance.

What has been described is a carrying case for transporting a disassembled fishing rod or other objects to keep the rod or objects safe from damage while being transported or stored. The carrying case, which is sized for storage of the rod, has a novel end closure. The carrying case has a hexagonal shape, both externally and internally, and the end closure includes an end cap having a round post section fitting into an open end of the case. Fittings are inserted in the post and these fit into an annular groove formed on the inside wall of the case, so to lock the end cap in place. When in place, the end cap is tightly secured and cannot easily or inadvertently opened. The carrying case is available in a variety of sizes for storage of other objects to securely store such objects and allow them to be readily transported. The body of the carrying case is formed of a single piece of wood, and the case may be attached to a sling so it can be draped over someone's shoulder for ease of carrying.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

Having thus described the invention, what is claimed and desired to be secured by letters patent is:

1. A portable carrying case for storing and transporting an object comprising:

a hollow tube a length of which is comparable to at least a length of an object fitted into the tube for storage or transport therein, the tube having an interior wall which is of a polygon shape;

an end piece closing one end of the tube;

an end cap closing the other end of the tube, said end cap including a round post insertable into and removable from said other end of the tube, the tube having an annular groove extending circumferentially about said interior wall and said post having a plurality of locking members mounted thereon and extending radially outwardly therefrom, the number of locking members being a function of the number of sides of the polygon, said post being positioned in said other end of said tube with each locking member positioned at a corner between adjacent sides of said polygon, said post having an inwardly extending bore formed in a sidewall thereof at a location different from that in which said locking members are mounted on said post, said end cap being locked in place by pushing said post into said tube until said locking member is adjacent said groove, and then turning said end cap for said locking members to be received in said groove; and, latching means latching said end cap in place and including a latch pin insertable in said bore.

2. The carrying case of said claim 1 wherein said tube has an exterior wall having the same polygon shape as said interior wall.

3. The carrying case of claim 2 wherein said interior and exterior walls are hexagonally shaped.

4. The carrying case of claim 1 wherein said locking members comprise studs equidistantly spaced about said post.

5. The carrying case of claim 1 further including a spring fitting in said bore and urging said latch pin radially outwardly.

6. The carrying case of claim 1 wherein a depression is formed in the interior wall of said tube at the location of said latch pin when said locking members are positioned in said groove, and turning said end cap to position said locking members in said groove also inserts said latch pin in said depression.

7. The carrying case of claim 6 wherein said tube, end piece and end cap are of wood, and said locking members and latch pin are of brass.

8. A case for storing and carrying the disassembled sections of a fishing rod comprising:

a hollow tube having a length comparable to at least that of the sections of fishing rod fitted into the tube, said tube being hexagonal in cross section whereby both the interior and exterior walls of the tube are hexagonally shaped, said interior wall having an annular groove extending circumferentially thereabout adjacent one end of the tube;

an end piece permanently closing an end of the tube opposite said end in which said annular groove is formed;

an end cap closing the first said end of said tube and including a round post insertable into and removable from the first said end of said tube, said post having a plurality of locking members mounted thereon and extending radially outwardly therefrom, the locking members comprising studs the number of which correspond to the number of sides of the hexagon, said post being positioned in the open end of said tube with said locking member positioned at a corner between adjacent sides of said hexagon, and said end cap being locked in place by pushing said post into said tube until said locking member is adjacent said groove, and then turning said end cap for said locking member to be received in said groove; and, latching means latching said end cap in place, said post having an inwardly extending bore formed in a sidewall thereof at a location different from that in which said locking members are mounted on said post, and a latch pin is insertable in said bore for latching said end cap in place.

9. The case of claim 8 wherein a hole is formed in the interior wall of said tube at the location of said latch pin when said locking members are positioned in said groove, and turning said end cap to position said locking members in said groove also positions said latch pin in said hole.

10. The case of claim 9 further including a spring fitting in said bore and urging said latch pin radially outwardly into said hole.

* * * * *